Figure 1:
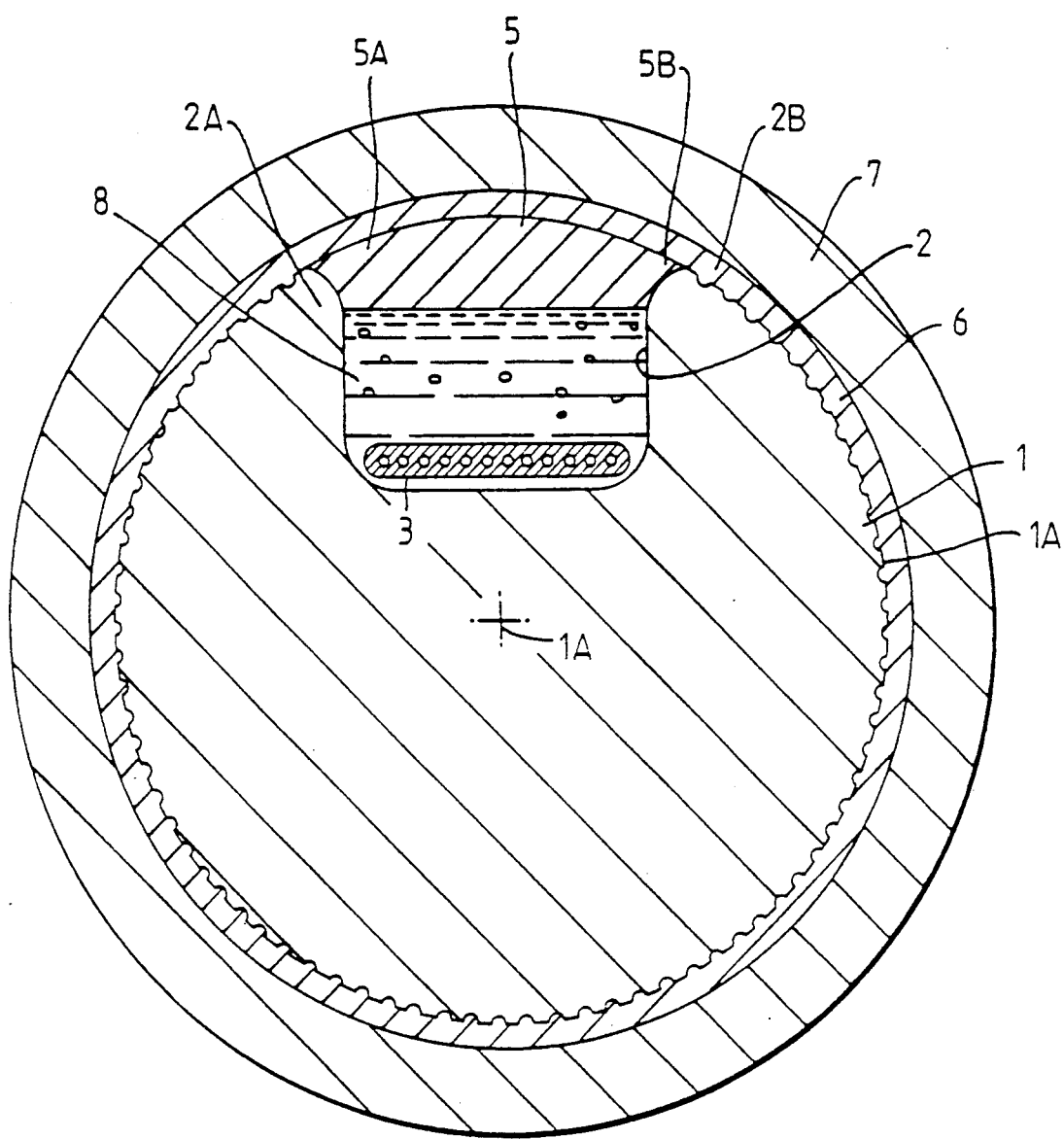

United States Patent [19]

Sutehall

[11] Patent Number: 5,050,960
[45] Date of Patent: Sep. 24, 1991

[54] AERIAL OPTICAL FIBRE CABLE

[75] Inventor: Ralph Sutehall, Abertillery, Great Britain

[73] Assignee: STC plc, London, England

[21] Appl. No.: 596,381

[22] Filed: Oct. 12, 1990

[30] Foreign Application Priority Data

Oct. 12, 1989 [GB] United Kingdom ................. 8922964

[51] Int. Cl.⁵ .............................................. G02B 6/44
[52] U.S. Cl. ................................................... 385/113
[58] Field of Search ..................................... 350/96.23

[56] References Cited

U.S. PATENT DOCUMENTS

| | | | |
|---|---|---|---|
| 4,217,028 | 8/1980 | Reh et al. ......................... | 350/96.20 |
| 4,252,405 | 2/1981 | Oldham ............................ | 350/96.22 |
| 4,460,159 | 7/1984 | Charlebois et al. ............... | 350/96.23 |
| 4,936,648 | 6/1990 | Yamaguchi et al. .............. | 350/96.23 |
| 4,944,570 | 7/1990 | Oglesby et al. ................... | 350/96.23 |
| 4,997,257 | 3/1991 | Spedding .......................... | 350/96.23 |

Primary Examiner—Frank Gonzalez
Attorney, Agent, or Firm—Lee, Mann, Smith, McWilliams & Sweeney

[57] ABSTRACT

An all-dielectric optical fibre cable comprises a strength member rod having a roughened surface formed by a moulding process during manufacture of the rod using a woven tape imprint, which serves to improve adhesion between an extruded outer sheath and the surface of the rod. The cable is suitable as an all dielectric aerial cable for large unsupported spans eg 500M, alongside a high voltage electricity distribution system.

5 Claims, 2 Drawing Sheets

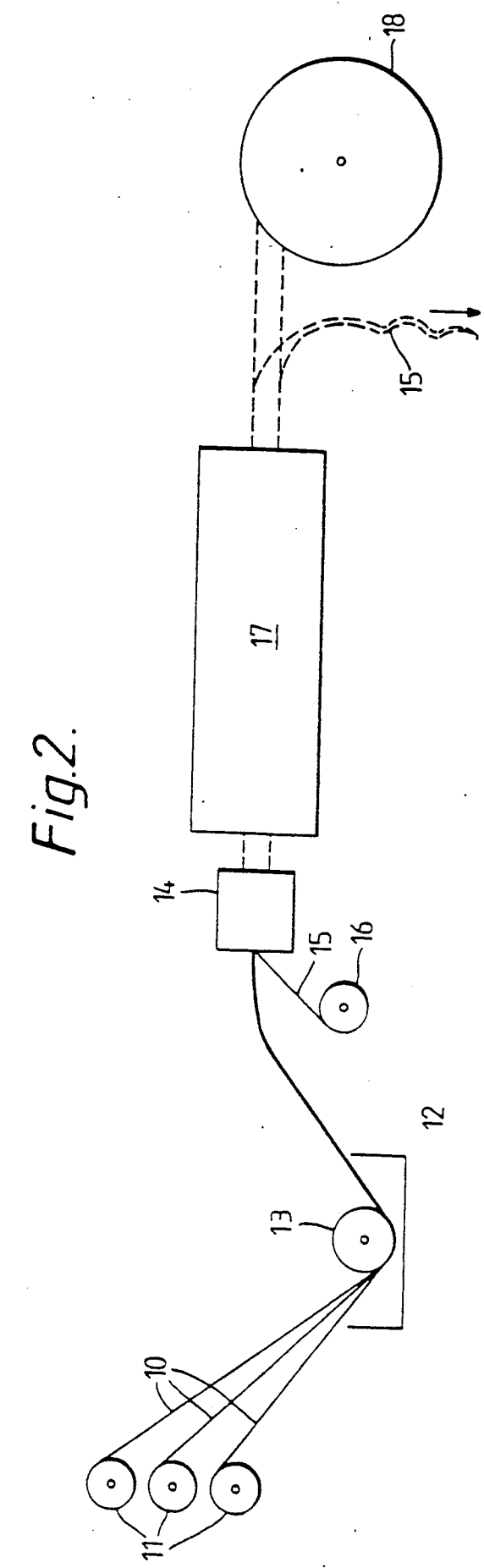

AERIAL OPTICAL FIBRE CABLE

This invention relates to an aerial optical fiber cable, particularly but not exclusively one that has no metallic components.

Our published European patent application No 0216548 discloses an all-dielectric aerial optical fiber cable in which the strength member comprises a rod-like member of pultruded glass reinforced plastics material and having a slot accommodating the optical fibers.

This strength member is tightly surrounded by an extruded plastic sheath and there may be an intermediate winding of tape or cord around the strength member prior to extrusion of the sheath.

In use, this cable is supported from pylons along with but spaced from the high tension electrical conductors for the purpose of providing a telecommunications link. The cable has the advantage of being able to be installed without the need for shutting down the high tension transmission because it is an all-dielectric cable.

Our European Application 0278648 discloses an all dielectric aerial optical fiber cable similar to our earlier patent discussed above and wherein the slot is filled with a water blocking compound and a slot cap is applied over the slot after it has been filled with water blocking compound, to close the slot, and the excess of water blocking compound is wiped cleanly away from the surface of the pultruded glass reinforced plastics rod.

We have found it is important to remove as far as possible any excess water blocking compound as this tends to prevent the outer sheath firmly gripping the rod-like strength member. As shown in this patent specification we have provided a binding around the strength member and the slot cap both to hold the slot cap in position and also to provide a frictional interface between the sheath and the strength member.

However we have experienced a certain amount of decoupling between the strength member and the sheath.

A known arrangement for providing adhesion between an extruded covering and an electrical conductor is shown in U.S. Pat. No. 4610909. Here unplasticised particles of PVC resin are coated onto the conductors and the portions of the particles contacting the surfaces of the conductor are melted and degraded and adhere to the surfaces of the conductors, forming a discontinuous coating of adhesion sites. A plasticised PVC resin is extruded over the conductors and a controlled degree of adhesion to the adhesion sites is claimed to occur.

In this arrangement the conductor and strength member are the same component, made of copper-coated steel and therefore very robust. However the dielectric cable of the above-mentioned European patent applications has a dielectric strength member which houses the optical conductors and which would be damaged by the process of degrading particles on the surface.

It is an object of the present invention to provide an alternative solution to this problem, without degrading the strength member.

According to the present invention there is provided an optical fiber cable comprising a dielectric rod-like strength member having a channel which contains an optical conductor, said conductor being protected against longitudinal and transverse stress applied to the strength member, said strength member being encased in an extruded sheath in contact with the surface of the strength member and wherein the surface of the strength member is roughened by moulding an imprint in the surface of the strength member in order to improve the grip between the sheath and the strength member.

Preferably the roughened surface of the strength member is produced during manufacture of the strength member while the strength member is in a soft condition, by impressing a rough surface mould onto the soft strength member so that when the strength member hardens, the rough surface contour becomes imprinted upon the surface of the strength member. Preferably this is provided by laying a woven tape around the outside of the strength member during manufacture and removing it after the strength member has hardened. Preferably the strength member comprises glass rovings impregnated with resin to produce a glass reinforced resin strength member with an imprinted roughened surface.

According to another aspect of the invention there is provided a method of making an optical fiber cable comprising a strength member rod closely embraced by an extruded sheath, the method comprising moulding the surface of the rod while the rod is soft and subsequently hardening the rod so that the moulded surface configuration remains imprinted in the hardened rod, and extruding a sheath into surface contact with the rod.

According to a further aspect of the invention there is provided a strength member for an optical fiber cable, comprising a dielectric rod having an open channel for housing an optical fiber and comprising fiber-reinforced-plastics material, the outer surface of said rod having a roughened surface formed by a moulded imprint in the surface.

Where the strength member is made by a glass reinforced resin rod by a pultrusion process, the surface is effectively "abraded" without damaging the glass rovings. If the glass rovings were damaged, this would seriously impair the strength of the glass reinforced resin rod.

In order that the invention can be clearly understood reference will now be made to the accompanying drawings in which:

FIG. 1 shows in cross-section an all dielectric optical fiber aerial cable according to an embodiment of the present invention; and FIG. 2 shows a method of making the strength member of the cable shown in FIG. 1.

Referring to FIG. 1, a non-electrically conductive rod 1 of homogenous material made from glass-fiber reinforced resin by a poltrusion or similar process, has a rectangular slot 2 with convexly radiused edges 2A and 2B, containing an optical fiber ribbon element 3 in the slot 2. The rod 1 acts as the cable strength member and the cable armour (having high tensile strength and being highly crush-resistant) and is resilient with a modulus of at least 40,000 Nmm$^2$.

The slot 2 runs straight along the rod 1 and is relatively shallow, that is to say it is always located to one side of the neutral axis of the cable which is at or close to the geometric center referenced 1A. The slot 2 is closed by a cap 5 made of extruded plastics material and having concavely radiused edges 5A and 5B which exactly fit onto the edges 2A and 2B of the slot 2.

The slot 2 is filled with a grease-like material 8, for example one sold under the brand name SYNTEC Type FCC210S and which is a soft thixotropic water blocking material.

Around the rod 1 and the cap 5 is a binder 6 which is helically wound around and serves to locate the cap 5 in place on the slot 2 prior to extrusion of an outer sheath 7 and during the induction of an excess length of fiber around a capstan as described in our published patent application 8703255, 8522796 and 8611177.

The rod 1 has a roughened surface 1A which improves the adhesion between the sheath 7 and the rod 1. It is pointed out that FIG. 1 is not to scale and the binder 6 is helically applied so that most of the surface 1A of the rod 1 is in direct contact with the sheath 7.

The configuration of the roughened surface 1A is in the form of moulded dimples produced by a woven tape which has been laid against the outside of the rod during manufacture and while the rod is in its soft state and removing the woven tape after the glass/resin rod substrate has been cured, thereby leaving a roughened surface produced by a "moulding" process. The shape and configuration of the woven tape becomes imprinted in the surface of the rod.

FIG. 2 shows in detail how this is achieved Referring to FIG. 2 the strength member rod 1 is produced by glass rovings 10 carried on bobbins 11 which are drawn into a resin bath 12 beneath a guide roller 13. The rovings 10, coated with resin, are drawn through a die 14 together with a peel-ply tape 15 drawn from a supply reel 16.

The tape is applied longitudinally around the impregnated glass rovings as they pass through the die 14 and into a curing oven 17 where the resin impregnating the glass rovings is cured.

The rod 1 thus produced emerges from the oven covered with the peel-ply tape 15 and is wound onto a take up drum 18. The peel-ply tape can either be removed prior to winding onto the take up drum 18 or alternatively can be left on the rod to be removed when the aerial optical fiber cable shown in FIG. 1 is manufactured. It is thus possible to draw the rod from the take up drum 18 during manufacture of the cable and peel off the peel-ply tape 15 before the optical fibers and the water blocking compound are introduced into the slot 2.

The mesh size of the peel-ply tape which moulds the roughened surface onto the rod is preferably about 0.1 mm. However a range of sizes would be suitable from 0.01 mm up to 1.0 mm for a rod having a diameter of around 8 to 10 mm as in the present embodiment.

The peel-ply tape 15 is so constructed that it does not adhere strongly to the outer surface of the rod 1 and can therefore be easily peeled away from it. This is accomplished by making the tape of woven or non-woven mono filament which does not have interstices into which the resin could penetrate and form a strong adhesive bond.

We have found that the roughened surface 1A on the rod 1 significantly improves adhesion between the extruded sheath 7 and the rod 1 so that during use and over long spans, e.g. 500 M between pylons, relative longitudinal movement between the rod and the sheath is substantially eliminated.

I claim:

1. An optical fiber cable comprising a dielectric rod-like strength member having a channel which contains an optical conductor, said conductor being protected against longitudinal and transverse stress applied to the strength member, said strength member being encased in an extruded sheath in contact with the surface of the strength member and wherein the surface of the strength member is roughened by moulding an imprint in the surface of the strength member in order to improve the grip between the sheath and the strength member.

2. A cable as claimed in claim 1, wherein the roughened surface comprises a moulded imprint formed during manufacture of the rod.

3. A cable as claimed in claim 2, wherein the moulded imprint has a mesh size in the range 0.01 mm to 1.0 mm.

4. A cable as claimed in claim 3, wherein the moulded imprint has a mesh size of approximately 1 mm.

5. A strength member for an optical fiber cable, comprising a dielectric rod having an open channel for housing an optical fiber and comprising fiber-reinforced-plastics material, the outer surface of said rod having a roughened surface formed by a moulded imprint in the surface.

* * * * *